Patented July 16, 1940

2,208,441

UNITED STATES PATENT OFFICE 2,208,441

SCRAP RUBBER TREATMENT AND REACTIONS

Herbert A. Winkelmann, Chicago, Ill., assignor to Marbon Corporation, Chicago, Ill., a corporation of Delaware No Drawing. Application November 30, 1936, Serial No. 113,465

3 Claims. (Cl. 260—771)

This invention relates to the preparation of compositions from scrap rubber which are particularly adapted for use in the production of high quality rubber hydrohalides. More particularly this invention relates to the treatment of zinc containing scrap rubber and to the production of rubber hydro-halides from the treated scrap rubber.

Practically all the scrap rubber commercially available is vulcanized rubber which contains considerable quantities of fillers, pigments, accelerators, anti-oxidants and the like. In almost every case zinc oxide or other zinc compounds are present, and in many cases iron compounds are also present. For most purposes this scrap rubber is not acceptable as such but is useful only after a reclaiming or thermoplasticizing treatment. It is the experience of reclaimers, however, that ordinary reclaiming treatment whether it be alkali, acid or neutral treatment and including the washing operations will not materially reduce the amount of zinc oxide and other zinc compounds present in the rubber. Exhaustive tests have shown that zinc containing scrap and the reclaim known to the art which is obtained therefrom are not suitable for the production of high quality rubber hydrochlorides because when hydrogen chloride is reacted with such scrap rubber or reclaim and then milled and molded with or without stabilizers the resulting product is soft and weak, of relatively poor oil and water resistance. It is entirely different from the hard, strong, oil and water resistant products obtained by milling and molding the rubber hydrochlorides obtained from crude rubber.

It is an object of this invention to provide a method for producing rubber hydrochlorides from scrap rubber and/or reclaim which are suitable for the production of hard, oil and water resistant, high tensile strength molded products.

Another object is to provide mixtures of scrap and/or reclaim rubber with or without crude rubber which are suitable for the production of high quality rubber hydrochlorides.

Other objects will become apparent on referring to the accompanying specification and claims.

After considerable experimenting I discovered that zinc compounds in rubber hydrohalides causes loss in tensile strength, and other valuable properties. These losses are particularly pronounced when the rubber hydrochlorides containing these zinc compounds are exposed to elevated temperatures such as may be obtained when undissolved rubber is reacted with gaseous hydrogen chloride under super-atmospheric pressure or when the rubber hydrochlorides are milled, calendered and molded.

The most harmful zinc compounds are zinc oxide and zinc chloride; and the least harmful is zinc sulphate. In addition to the zinc compounds the iron compounds also produce deleterious effects, particularly iron chloride, but the iron compounds are not as harmful as the zinc compounds and, furthermore, are always present in scrap rubber in conjunction with zinc compounds although the zinc compounds may not be present with iron.

My method of producing an improved rubber composition for the production of high quality rubber hydrochloride, therefore, involves essentially the reduction in the amount of active zinc compounds in scrap rubber. This reduction may be accomplished by removal of zinc compounds or by conversion of the more active zinc compounds into less active zinc compounds, or by a combination of these means. The more active and harmful zinc compounds such as zinc oxide may be converted to the less active and less harmful zinc sulphate by treatment of the rubber containing such compounds with sulfuric acid. Preferably the zinc sulphate and any iron sulphate which may be present is also removed by repeated and extensive washing. Instead of a sulfuric acid treatment, however, the rubber may be treated with hydrochloric acid or caustic so that the zinc compounds are converted to chlorides or zincates which, because they are more harmful than the sulphate, must substantially all be removed.

It is only by long and repeated acid or alkali treatment followed by extensive washing that the amount of zinc compounds in the rubber are sufficiently reduced or converted to an inactive state so that a high quality rubber hydrochloride may be made therefrom which can be milled, calendered and molded in the presence of basic stabilizers such as magnesium oxide, litharge, calcium oxide, sodium carbonate, and made into useful articles of manufacture of hardness and tensile strength which compare favorably with that of products made from rubber hydrochloride obtained from crude rubber.

The invention may be better understood by referring to the following example:

Ground inner tube scrap analyzing approximately by weight: rubber 71, zinc oxide 6.8 (zinc 5.5), blanc fixe 16, accelerator 1, sulfur (combined) 2, sulfur (free) .5, antioxidant .5 and stearic acid 2 was refluxed with 10% sulfuric acid for thirty hours. The rubber was filtered, washed and replaced in the container with fresh 10% sulfuric acid. This was refluxed an additional twenty-four hours and then the filtration repeated. The rubber was then refluxed in fresh water for ten hours, filtered, and the rubber dried at room temperature.

The analytical results were as follows:

|  | Total basis | Rubber basis |
|---|---|---|
| Percent of zinc in original inner tube scrap | 5.5 | 7.7 |
| Percent of zinc removed in first 30 hours of reflux | 4.4 | |
| Percent removed by second reflux of 24 hours | .2 | |
| Percent zinc in final product | 1.3 | 1.65 |
| Total loss of weight of scrap after treatment | 10 | |

The dried and purified product was divided into two parts, one was sent to a reclaimer for the so-called reclaiming treatment which is in reality a high temperature treatment which plasticizes the rubber. The other portion was not reclaimed. The reclaimed or heat plastized portion and the unreclaimed portion were then separately treated. In accordance with the preferred procedure the portions were mixed with smoked sheet rubber in the proportion of 3⅓ parts by weight of smoked sheet rubber to 1 part of zinc free scrap or reclaim, and then reacted with gaseous hydrogen chloride under 300 lbs. per sq. in. pressure at approximately 90° C. Other portions were not admixed with rubber but reacted directly with the hydrogen chloride. The resulting rubber hydrochlorides were milled with 10 parts MgO and 5 parts PbO per 100 parts of rubber hydrochloride and then molded into blocks for testing.

The following tests were made on the molded rubber hydrochlorides:

| Type of rubber used in making R-HCl | Percent Cl | Tensile | Elongation | Set | P&J hardness |
|---|---|---|---|---|---|
| 1 part zinc containing tube scrap +3⅓ parts smoked sheet | 30.4 | 2400 | 80 | 6 | 4 |
| 1 part zinc free tube scrap +3⅓ parts smoked sheet | 30.6 | 3880 | 10 | | 9 |
| 1 part zinc containing metal tube reclaim +3⅓ parts smoked sheet | 29.5 | 1950 | 490 | 31 | 25 |
| 1 part zinc free tube reclaim +3⅓ parts smoked sheet | 30.7 | 4270 | 10 | | 4 |
| Straight smoked sheet | 32.3 | 4300 | 10 | | 3 |

Strips of the rubber hydrochloride were immersed in 20-80 benzol-gasoline mixtures for 48 hrs. at 20° C., and also in kerosene at 70° C. The percent weight and percent volume increase in each case was noted immediately after removal. The following table gives the results of the tests:

| Type of rubber used in making R-HCl | Benzol-gasoline | | Kerosene | |
|---|---|---|---|---|
| | Percent weight | Percent volume | Percent weight | Percent volume |
| 1 part zinc containing scrap +3⅓ parts smoked sheet | 24.4 | 27.2 | 4.1 | 11.1 |
| 1 part zinc free scrap +3⅓ parts smoked sheet | 4.1 | 4.2 | 0.9 | 13.2 |
| 1 part zinc containing reclaim +3⅓ parts smoked sheet | 39.1 | 51.2 | 7.1 | 12.5 |
| 1 part zinc free reclaim +3⅓ parts smoked sheet | 3.1 | 0.0 | 0.8 | 11.6 |
| Straight smoked sheet | 1.8 | 2.3 | | |

The invention is not limited to reactions of dry purified scrap and/or reclaim with gaseous hydrogen chloride but includes reactions of purified scrap and/or reclaim with liquefied hydrogen chloride and also with hydrogen chloride which is dissolved in a suspending liquid for the purified rubber.

The exact mechanism of the action of zinc compounds and like compounds on rubber hydrohalide is not known. Possibly the compounds promote cyclization, perhaps they simply accelerate decomposition during heat treatment. The invention is not limited to any theory or mode of action, or to the particular details and proportions above given except as may be necessitated by the prior art. Obviously, proportions, temperatures and time of treatment may be considerably varied without departing from the spirit of this invention. However, in general it is advisable to reduce the amount of zinc oxide present in the rubber to below 2% zinc on the basis of the rubber, and preferably to remove substantially all of said compound. Since practically all scrap rubber contains more than 5% of combined zinc on the basis of the rubber my process results in a substantial reduction in the amount of such compounds present with consequent increase in valuable properties in the molded resulting rubber hydrochlorides. Although the iron compounds are not as harmful as the zinc compounds they cause some loss in tensile strength, poor aging, and have other deleterious effects on rubber hydrochloride and so should also preferably be removed. However, any process of removing zinc compounds also removes the iron compounds.

Instead of removing zinc compounds from zinc containing scrap it is, of course, possible to choose a scrap or a reclaim which does not contain zinc and react that with hydrogen chloride. A sulfur vulcanized scrap or reclaim containing lead oxide as an activator in place of zinc oxide is particularly valuable.

My invention has its chief value in the production of milled, calendered and molded articles of manufacture in which the rubber hydrohalide compositions containing stabilizers are exposed to a fluxing temperature. Rubber hydrohalide compositions obtained from my treated scrap rubber can also be satisfactorily vulcanized whereas hitherto it has not been possible to obtain satisfactory vulcanizates from the common scrap or reclaim which is commercially available. Details as to vulcanizing rubber hydrochlorides may be found in my copending application Serial No. 22,431, filed May 20, 1935.

My invention is not only applicable to the production of rubber hydrohalides but is useful in the production of chlorinated rubber and other halogen containing rubber derivatives. Zinc and iron compounds act similar on chlorinated rubber to their action on rubber hydrochlorides. The removal of these compounds from scrap rubber is, therefore, of value in the production of chlorinated rubber as well as for rubber hydrohalides.

I claim:

1. The method of making rubber hydrochloride from rubber containing more than 2% by weight of zinc oxide, which comprises heating said scrap rubber with dilute sulfuric acid in such amount and for sufficient time as to convert substantially all of said zinc oxide to zinc sulphate, and reacting said treated rubber with hydrogen chloride.

2. The method of making rubber hydrochloride from rubber containing a relatively insoluble zinc compound in excess of 2% by weight which comprises heating said scrap rubber with a reagent of such character and in such amount and for sufficient time as to convert substantially all of said zinc compound into a more soluble compound, washing out from said rubber substantially all of said soluble compound to produce a rubber composition which is substantially free from zinc compounds and reacting said rubber composition with hydrogen chloride.

3. The method of making rubber hydrochloride from rubber containing more than 2% of zinc oxide which comprises heating said rubber with dilute sulfuric acid in such amount and for sufficient time as to convert substantially all of said zinc oxide to zinc sulfate, washing out from said rubber substantially all of said zinc sulfate, and reacting the washed rubber with hydrogen chloride.

HERBERT A. WINKELMANN.